(No Model.)

M. S. TRACY.
CULINARY VESSEL.

No. 540,702. Patented June 11, 1895.

Witnesses
G. W. Stipek
C. L. Loomis Jr

Inventor
Milton S. Tracy.
By James Shepard
Atty.

THE NORRIS PETERS CO., PHOTO-LITHO., WASHINGTON, D. C.

UNITED STATES PATENT OFFICE.

MILTON S. TRACY, OF GLASTONBURY, CONNECTICUT.

CULINARY VESSEL.

SPECIFICATION forming part of Letters Patent No. 540,702, dated June 11, 1895.

Application filed June 30, 1894. Serial No. 516,201. (No model.)

*To all whom it may concern:*

Be it known that I, MILTON S. TRACY, a citizen of the United States, residing at Glastonbury, in the county of Hartford and State of Connecticut, have invented certain new and useful Improvements in Culinary Vessels, of which the following is a specification.

My invention relates to improvements in culinary vessels, and the chief object of my improvement is convenience in manipulating the cover.

Figure 1:
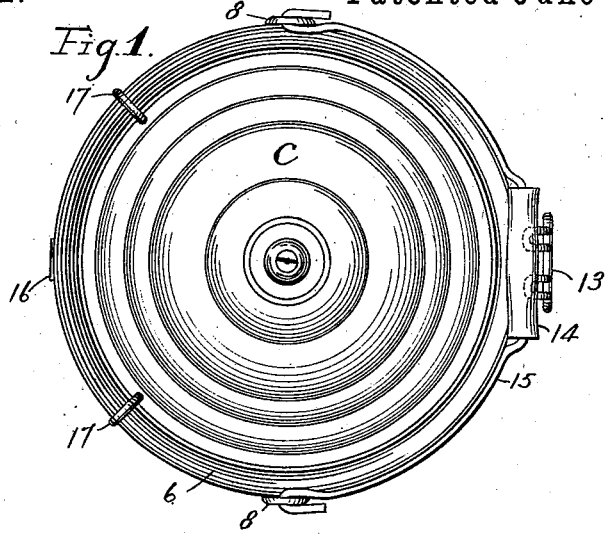
Figure 2:
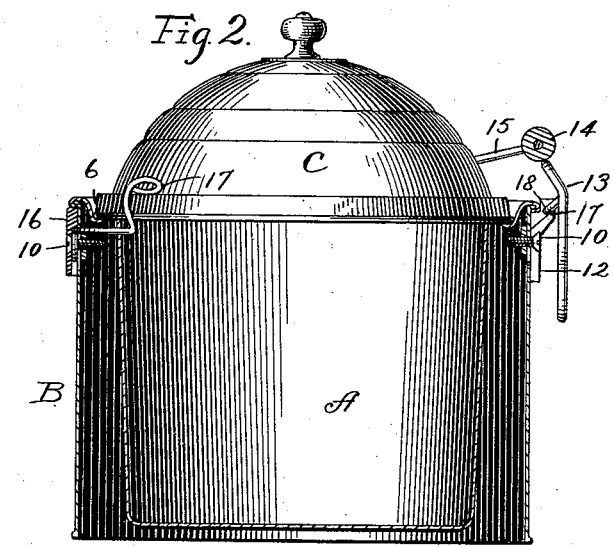
Figure 3:
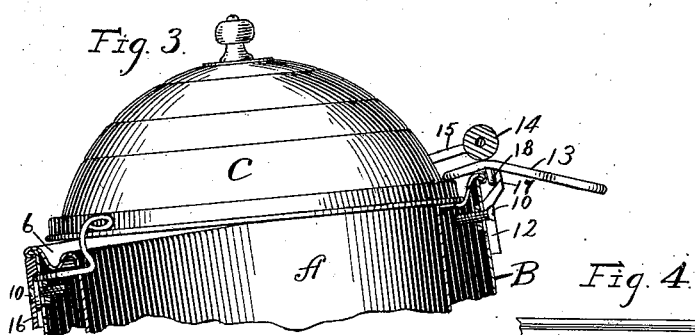
Figure 5:
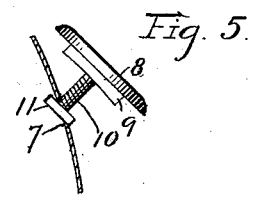
Figure 4:
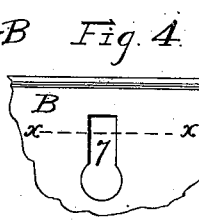

In the accompanying drawings, Figure 1 is a plan view of my vessel. Fig. 2 is a central vertical section partly in side elevation. Fig. 3 is a like view of the upper portion of my vessel with the cover in the position for pouring therefrom. Fig. 4 is a side elevation of a portion of the vessel, showing the slotted opening for attaching the kettle-ears, &c.; and Fig. 5 is a horizontal section on the line $x\ x$ of Fig. 4, together with a plan view of one of the kettle-ears and the bolt by which it is fastened, the same illustrating the manner of assembling the parts.

A designates the vessel which is surrounded by an annular chamber formed by the exterior of the vessel proper, and the cylinder B, said parts being united at the top and provided with an annular groove 6, within which the cover C may rest, all substantially as in culinary vessels heretofore used. These parts may be formed of either sheet or cast metal, but I prefer to form them of sheet metal. In the sides of the cylinder B near its top, I arrange as many slots 7, Fig. 4, as there are trimmings to be attached, the same being arranged in proper position.

The kettle ears 8, have their lower part fitted to the curvature of the vessel and provided with a shoulder 9 to set up under the rim of the cylinder B, and they are also perforated for the reception of the bolt 10. The bolt is preferably first passed through the kettle ear, and the nut 11 screwed upon its end far enough to hold it in place, and the nut and bolt then passed through the slot 7, as illustrated in Fig. 5, after which the bolt is turned to tighten up the ears and hold them in place.

In addition to the ears I provide a bracket 12 which is secured to the kettle in the same manner and upon which bracket is mounted the combined tilting handle and cover holder 13. This bracket is provided with a stop shoulder 17 near the pintle portion 18 of said tilting handle 13 for limiting the movement of said handle in one direction so as to stop it in its upright position, as shown in Figs. 1 and 2. The handle 14 of the bail 15 may then rest upon its upper end, as shown, so as to hold the handle in an elevated position and prevent it from being unduly heated while at the same time the lower end of said handle does not come in contact with the side of the vessel.

Diametrically opposite the bracket 12 is a spring bracket 16 which is secured by means of a bolt in the manner before described, and which bracket supports the two spring arms 17 at one side of the kettle, and, when the cover is seated within the annular groove, so that their upper ends extend over the base rim of the cover, as shown in Figs. 1 and 2.

When it is desired to pour liquid from the kettle and yet have the cover retain the remaining contents of the kettle, the cover C is lifted slightly on one edge so that the spring arms 17 bear against the vertical edge of the lower rim of the cover and hold it in a slightly elevated position, while the combined lifting handle and cover holder 13 bears upon the top of said bottom rim of the cover at the opposite side of the kettle, as shown in Fig. 3. After the liquid is poured out, the cover can be again seated in the annular groove and detached from the spring arms 17 by merely depressing it.

I am aware that a prior patent shows spring arms, formed of wire and arranged on diametrically opposite sides of a kettle to hold the cover on, but not adapted for holding the cover in place when in an elevated position; also that it is broadly old to provide a kettle or vessel with a combined tilting handle and cover holder and said prior art is hereby disclaimed.

I claim as my invention—

1. The combination of a vessel with the cover having several bearing surfaces for being engaged by spring arms, and a pair of spring arms 17, arranged on said vessel at one side of the center of the cover for holding one side thereof in place when in an elevated position, substantially as described and for the purpose specified.

2. The combination of a vessel and a cover, the latter provided with several bearing surfaces, curved spring arms adapted to support the edge of the cover when in an elevated position, said arms having hooked ends adapted to engage the respective bearing surfaces of the cover, substantially as specified.

3. The combination of the vessel and its bail with the combined tilting handle and cover holder 13 and a stop for setting said handle in its upright position, for supporting said bail above the rim of the vessel, substantially as described.

MILTON S. TRACY.

Witnesses:
THOMAS M. SMITH,
ROBERT W. DWYER.